Nov. 11, 1958 K. R. McCONNELL ET AL 2,860,180
REMOTE CONTROL SYSTEM FOR CONTINUOUS FACSIMILE RECORDER
Filed April 27, 1953 5 Sheets-Sheet 5

INVENTORS
K. R. McCONNELL
P. R. MARZAN
BY
ATTORNEY

2,860,180

REMOTE CONTROL SYSTEM FOR CONTINUOUS FACSIMILE RECORDER

Kenneth R. McConnell, Monmouth County, N. J., and Peter R. Marzan, New York, N. Y., assignors to Times Facsimile Corporation, New York, N. Y., a corporation of New York Application April 27, 1953, Serial No. 351,184

15 Claims. (Cl. 178—6.6)

This invention relates to control apparatus for facsimile recorders and in particular to a remote control system for controlling various functions of the recorder that have previously been performed by an operator, the present system being a modification or improvement of that described in our prior Patent No. 2,640,874, granted June 2, 1953.

One object of the invention is to provide automatic control of a facsimile recorder in response to signals transmitted from the transmitter, said signals being modulated carrier signals adapted for transmission over any circuit or channel that would transmit the facsimile signals. While it has been proposed to start and phase a recorder in response to transmitted control signals, in accordance with the invention additional control functions are provided which are often necessary to insure the reception of good copy under the various conditions met in practice.

Another object of the invention is to provide a novel control circuit which remains in standby or inoperative condition until the start of a transmission, the circuit being designed to disregard test signals, noise or voice signals, even if of the same amplitude and frequency as the facsimile signals.

Another object of the invention is to devise a novel circuit responsive to the level of the signal at the start of transmission and arranged to automatically adjust the level or the gain of an amplifier in the recorder for optimum recording.

Another object of the invention is to provide a control system in which preliminary adjustments are automatically made at any time prior to the beginning of the transmission without starting the recording mechanism, so that scanning and paper feed at the recorder are only initiated when the copy transmission actually starts.

Another object of the invention is to provide for automatically stopping the scanning and paper feed mechanism of the recorder if the received signal is interrupted due to line failure or other cause; and/or provide for automatically restarting the scanning and paper feed mechanism when the facsimile signal reappears without losing the phasing adjustment of the recorder.

Another object of the invention is to provide improved means for resetting the recorder control mechanism to standby condition at the end of transmission or in response to a stop signal.

Other objects and advantages of the invention will be apparent from the following description of a preferred system embodying the same shown in the accompanying drawings, in which.

Figure 1:
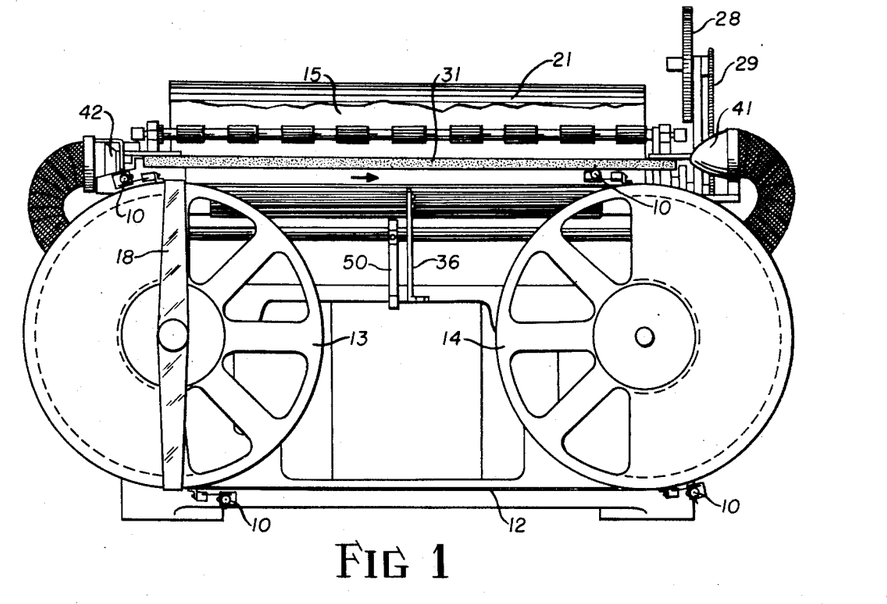
Figs. 1 and 2 are front elevational and top views of a continuous recorder with which the invention may be used.
Figure 2:
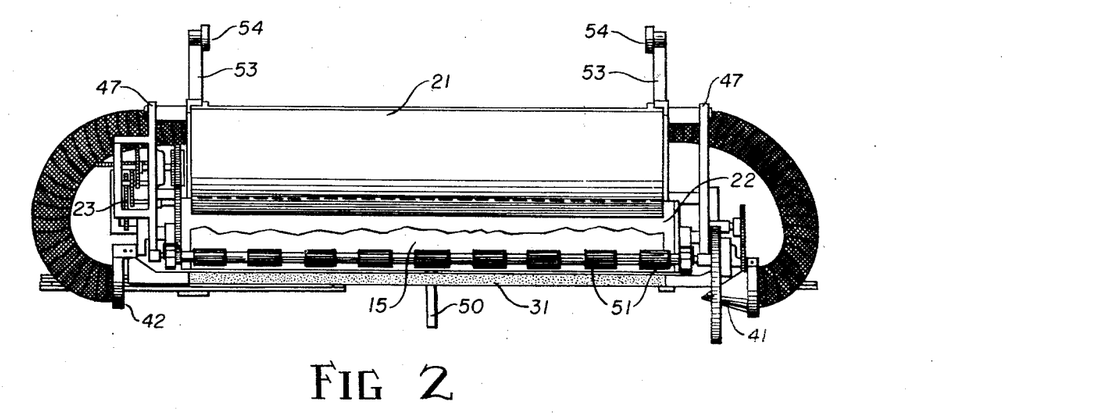

Referring to the drawings, a system embodying the invention may employ a continuous recorder similar to that shown in Figs. 1 and 2 by way of example. Other recorders of a suitable type may also be employed although preferably a continuous or other type of recorder is used which does not require manual reloading with recording paper after each transmission. The recorder shown in Figs. 1 and 2 is of the multiple-stylus type embodying certain features disclosed and claimed in prior patents of A. G. Cooley, Nos. 2,643,173 and 2,643,174, assigned to the assignee of the present application, to which reference may be made for a more complete disclosure of the structural details thereof. In the particular embodiment shown, the recorder comprises four equally spaced styli 10 secured in a stylus assembly 11 as shown in detail in Figs. 3 and 4. Each stylus assembly is attached to a movable belt or carrier 12 which is supported by two rotatable wheels or pulleys 13 and 14 as shown in Fig. 1. The wheel or pulley 14 is driven by a motor (not shown) and serves to propel the styli across the width of the recording sheet 15 in the direction indicated by the arrow in Fig. 1.

As explained more fully in said prior Patent No. 2,643,174 referred to above, the driving pulley 14 is driven by an induction or series motor tending to move the styli 10 above synchronous speed. In order to hold the progressive movement of the styli across the recording area at exactly synchronous speed, a synchronous rotating arm 18 is arranged to engage a projecting lug 19 on the stylus assembly (Fig. 4) to retard the speed of each stylus to synchronous speed. As will be clear from Fig. 1, each end of the synchronous speed-control arm or member 18 becomes alternately operative to engage one stylus assembly after another and is in contact with the stylus mounting at the lug 19 during approximately one-half of the revolution of the drive wheel 14. During this period the operative stylus 10 makes one complete excursion across the width of the recording sheet 15.

The synchronous speed-control member 18 is connected through a suitable clutch and phasing mechanism to a synchronous motor as described in said prior Cooley patent, No. 2,643,173.

The phasing mechanism is further described, in a preferred form, in the patent to Cooley, No. 2,492,621, granted December 27, 1949. This mechanism comprises a rotatable member which is phased with the transmitter scanner by a phasing pulse, and which may be subsequently coupled to the recording mechanism to phase the latter at the commencement of the recording operation. Since the speed of the synchronous motor is maintained, as by a local source of controlled frequency at exactly synchronous speed, the recording system is maintained in synchronism with the scanning element of the remote transmitter.

The sheet 15 of recording paper is fed from the paper supply roll 21 (see Fig. 2) underneath the feed roll 22 which, in turn, is driven through reduction gearing 23 from the recorder drive mechanism to feed the paper through the recorder.

Figure 3:
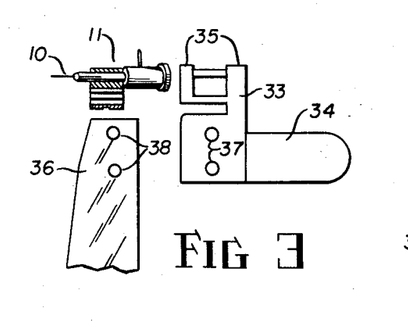
Figs. 3 and 4 are detailed views showing the method of replacing the recording stylus.
Figure 4:
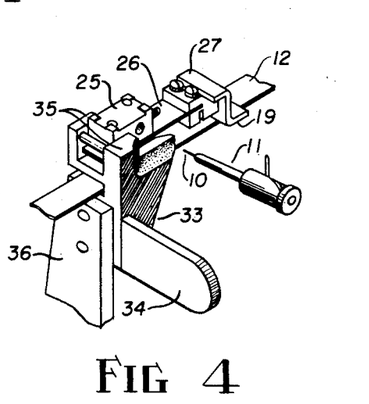

Referring to Figs. 3 and 4, the stylus assembly 11 comprises a hollow tubular member containing stylus 10 and which is removably mounted in a transverse aperture in the mounting block 25. In this manner the stylus can be readily replaced in an accurately indexed position when it becomes worn or damaged. The detailed construction of the stylus assembly shown by way of example is disclosed and claimed in the copending application of William Allwood, Ser. No. 351,906, filed April 29, 1953, now abandoned. The mounting block 25 is supported on an insulating strip 26 of nylon or other stiff flexible insulating material carried by the bracket 27. The bracket 27 is welded or brazed to the metallic stylus carrier or belt 12 in the position shown in Figs. 1 and 4. The insulating strip 26 insulates the mounting block 25 and its associated stylus 10 from the belt. The signal current is applied to the stylus through the mounting block and a metallic guide 31, forming a contact rod which also serves to maintain the stylus against vertical movement or oscillation at it traverses the recording area.

As disclosed in the copending application of Austin G. Cooley, Ser. No. 319,021, filed November 6, 1952, now Patent No. 2,796,316, issued June 16, 1957, the stylus guide 31 is preferably an elongated magnet element, lubricated as by constructing the bearing face of porous bronze saturated with a lubricant. Thus the mounting block 25, of magnetizable metal, is held against the magnetic guide member 31 as the belt 12 carries the stylus assembly across the recording area, to maintain each stylus exactly in the recording path.

To prevent deforming or damaging either the stylus carrier 12 or the mounting assembly for the stylus including the flexible strip 26, when replacing the stylus, the holder 33 shown in Figs. 3 and 4 may be used. This holder is provided with a handle 34 and vertical projections or ears 35 adapted to embrace the stylus mounting block 25. A stationary bracket 36 underneath the belt is adapted to support or position the holder 33 when the latter is pushed into the position shown in Fig. 4. In this position with the stylus mounting block 25 firmly held by the holder 33, the stylus assembly 11 which is held in place by a suitable detent can be withdrawn from the block 25 and a new assembly inserted without the possibility of twisting or breaking the belt or stylus assembly. Preferably the holder 33 is held on the bracket 36, as by means of the holes 37 adapted to register with the pins 38 in the bracket.

Figure 5:
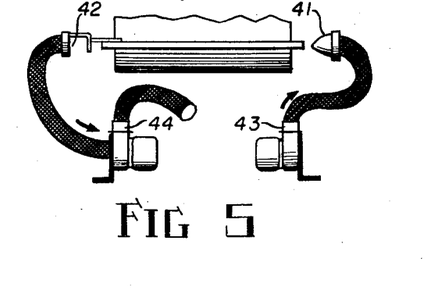
Fig. 5 is a detailed view of the smoke exhaust system.

Referring to Fig. 5, an improved arrangement for removing the dust and smoke emitted in recording comprises a blower nozzle 41 and an associated exhaust opening 42 adjacent the ends of the recording area. As shown more clearly in Fig. 1, the blower nozzle 41 is located at the forward end of the path traversed by the stylus needle as it records on the recording sheet. Two separate fans or blowers may be employed as indicated at 43 and 44, the exhaust of the fan 44 being coupled to an activated carbon filter (not shown) or an exhaust opening outside of the room in which the equipment is located. It is found that this double nozzle arrangement is much more efficient than the usual arrangement of a suction opening extending across the entire width of the recording area and in addition has the advantage that it does not obscure this area.

Figure 6:
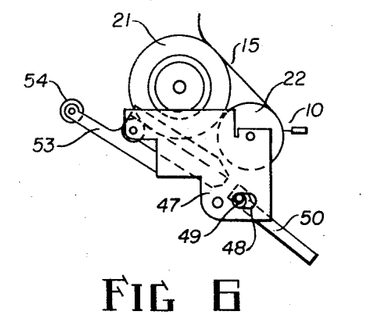
Figs. 6, 7 and 8 are detailed views of a preferred arrangement for supporting the paper supply roll.
Figure 7:
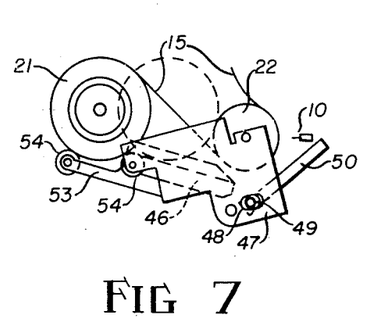

Referring to Figs. 2, 6, 7 and 8, the paper feed roll 22 and the inclined supporting members 46 for the paper supply roll 21 are carried by two tiltable end plates 47. The plates 47 are each provided with elongated slots 48 to receive a pivoted cam rod 49 connected to a handle 50. The handle 50 projects out in front of the recorder in a position where it can be readily grasped by the operator or serviceman. When it is necessary to replace the supply roll 21, the handle 50 is raised to the position shown in Fig. 7 to separate the paper feed roll 22 from the recording stylus 10 on its carrier (not shown). In this position the end of the recording sheet on the replacement supply roll 21 may be readily wrapped around the feed roll 22 and inserted between the feed roll and the pressure rolls 51 (see Fig. 2). If desired, additional supporting members 53 may be provided at the rear of the recorder for supporting the supply roll 21 as the paper is fed through the machine during the reloading operation. In the position of the supply roll shown in Fig. 7, the roll is removed from frictional contact with the feed roll 22 and thus may be readily rotated by pulling on the free end of the recording paper when reloading the machine. The supports 53 for the supply roll may be provided with anti-friction rollers or bearings 54 as shown. When the paper has been fed through and wrapped around the feed roll 22, the handle 50 is depressed to restore the relation between the recording sheet and the stylus 10 required for the recording operation, as shown in Fig. 6. The frictional contact between the recording paper 15 and the driven feed roll 22 feeds the paper at the desired rate during the recording.

Figure 8:
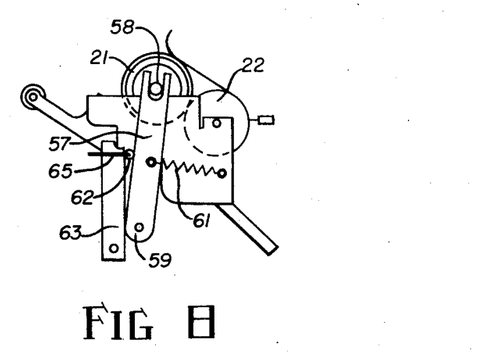

In order to maintain the supply roll in contact with the feed roll 22 when the machine is subjected to tilting or violent pitching motion as on board ship, a forked member 57 may be provided as shown in Fig. 8 at each end of the recorder to engage a shaft or projection 58 extending from each end of the supply roll 21 or fastened thereto. The forked arm 57, as shown, is pivoted at 59 and urged forward by a spring 61 to maintain the supply roll in contact with the feed roll 22. A bar 62 extending across the width of the machine underneath the supply roll may also be provided to hold the forked arm 57 in its forward position and prevent the supply roll 21 from moving away from contact with the feed roll 22 as a result of pitching or tilting of the recorder. The bar 62 becomes wedged between the arms 57 and the stationary brackets 63, and drops down as the supply roll 21 is consumed so as to maintain the arms 57 locked and thereby hold the supply roll at all times against the feed roll 22. The locking bar 62 may be provided with a handle 65 for lifting the bar out of its wedged position to release the supply roll when the recorder is to be reloaded.

Figure 9:
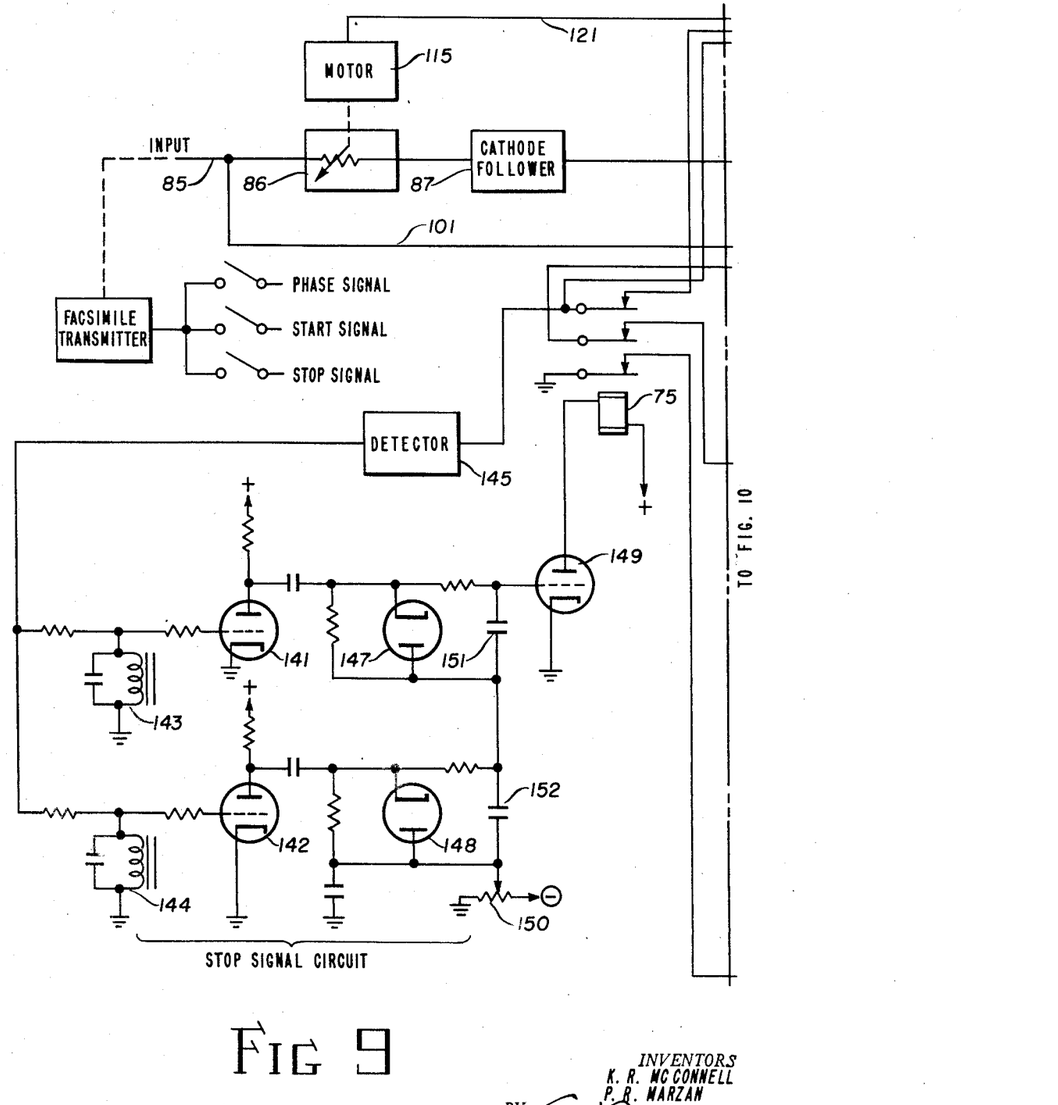
Figs. 9, 10 and 11 taken together form a diagrammatic circuit of amplifier, demodulator and control system embodying the invention, as used with a recorder such as that shown in Figs. 1 and 2.
Figure 10:
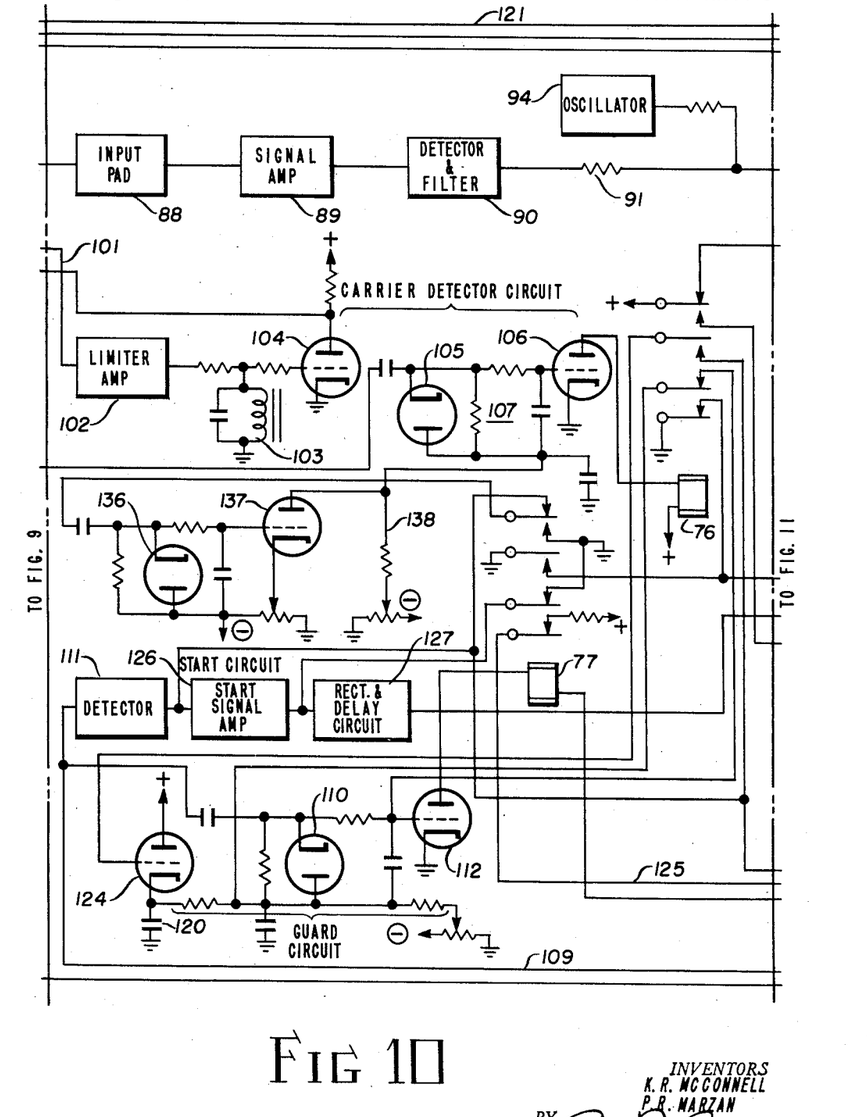
Figure 11:
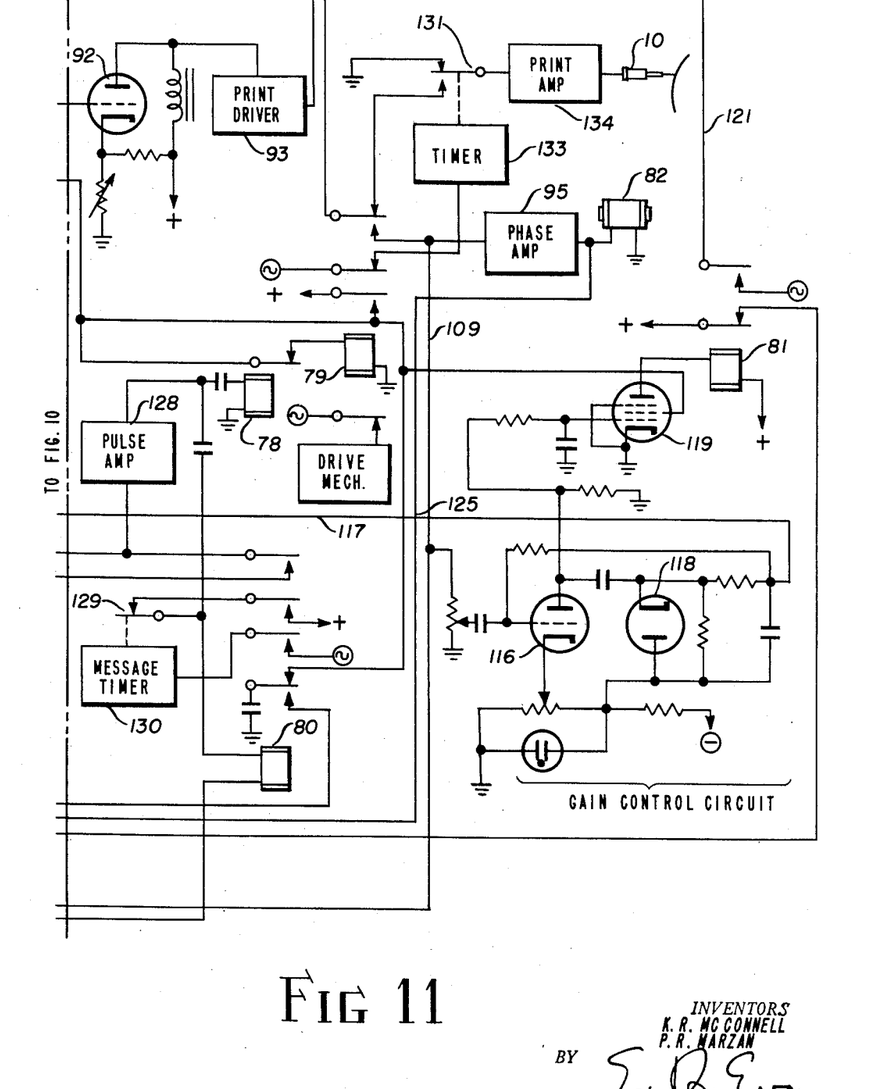

Referring to Figs. 9, 10 and 11, a control system for a facsimile recorder in accordance with the preferred form of the invention is shown. This control system is similar in certain respects to that described in said prior Patent No. 2,640,874, above referred to, but embodies certain additional features. As shown herein, certain control functions are effected in response to predetermined modulation or interruption of the facsimile carrier. These signals may be generated at the transmitting station either manually or automatically by suitable timing and keying mechanism as described in said prior Patent No. 2,640,874.

Prior to the facsimile transmission, "phase" and "start" signals are transmitted over the transmitting channel which connects to the input terminal 85 shown in Fig. 9. The phase signal consists of a steady carrier, for example 1800-cycle carrier, interrupted once a second to produce short phasing pulses at one-second intervals. The start signal consists of an 1800-cycle or other suitable frequency facsimile carrier having a 60-cycle amplitude modulation and lasts for only a short time, for example two seconds. It is assumed that the facsimile signal following the start signal consists of a carrier, for example 1800 cycles, which is amplitude modulated.

In the following explanation it will be further assumed that the stylus carrier drive for the recorder is connected through the synchronous arm movement and clutch mechanism to a synchronous motor substantially as shown in the prior patent of A. G. Cooley, No. 2,492,621 referred to above, so that the phasing mechanism of the recorder may be phased with the transmitter scanner without starting the stylus carrier drive mechanism. As described therein with this construction, when the run motor is energized, the recording mechanism is driven until it is in synchronism and phase with the phasing mechanism and synchronous motor drive. At this time it is automatically coupled to the synchronous drive and remains in synchronization until the recording is completed. Since this type of phasing mechanism is well known and is fully described in the prior art, it is not described herein for the sake of simplicity.

The control mechanism includes the control relays 75 through 81 and a normally energized phasing magnet 82. Prior to a transmission all of said relays are deenergized except relay 79, which is energized through a circuit including the upper armature and back contact of relay 76 to battery and the armature and back contact of relay 78.

In the preferred arrangement shown, phase and start signals are received immediately before transmission of the facsimile copy. In response to the phase signal, the gain of the recorder is adjusted to the optimum level and the recorder synchronous driving mechanism is phased, without attention from a receiving operator. In response to the start signal, the recording mechanism is started and brought up to synchronous speed and power is connected to the recording styli. In accordance with another feature of the invention, at the end of the message, a "stop" signal may be transmitted which stops the recording and paper feed functions of the recorder, disconnecting power from the recording styli. The use of a stop signal permits transmission of a message or copy of shorter than normal length, while insuring that the recorder will be returned to standby condition in readiness for the next transmission at the end of each such message. It will thus be seen that the novel system provides for automatically performing the functions of adjusting signal level, phasing, starting and stopping the recorder usually effected by a receiving operator for each copy transmitted.

When the phase signal is received, it is fed from the input circuit 85 through a motor-driven level control or potentiometer 86, cathode follower amplifier 87, a manually adjustable potentiometer 88, signal amplifier 89, detector and low pass filter 90, coupling resistor 91 and modulator 92 to print-driver amplifier 93. An oscillator 94 is also connected to the modulator 92, the output frequency of said oscillator being higher than that of the facsimile carrier (1800 cycles) to provide the desired recording characteristics at the stylus 10.

The modulator 92, of the type described in the patent to K. R. McConnell, No. 2,542,152, is keyed by the D. C. signal output of the detector unit 90 which includes a carrier-elimination filter. The oscillator frequency to be used depends upon the type of recording paper used and may, for example, be 15 kc. or more.

Since relay 79 is energized, phase pulses are fed from the print driver to a phasing amplifier 95 through the outer armature and back contact of relay 75 and the outer armature and front contact of relay 79. The phase signal is also impressed through conductor 101, limiter amplifier 102, carrier band pass filter 103, amplifier 104, rectifier 105, and amplifier 106 upon the winding of relay 76. Since the filter or tuned circuit 103 in shunt to the signal circuit sharply attenuates all frequencies except the carrier, rectified output of the carrier detector circuit 102—106 will cause the energization of relay 76 only when the carrier is received. This circuit also includes a time delay circuit 107 to prevent the operation of relay 76 on noise or spurious frequencies, for example between the facsimile transmissions.

It will be noted that relay 76 is not energized if the recorder is turned "on" during a facsimile transmission started previously. The print driver signal is fed through the outer armature and front contact of normally energized relay 79 and conductor 109 to the guard circuit rectifier 110 as well as the signal detector 111. The rectifier 110 is short-circuited by the second armature and back contact of relay 76. The signal detector 111 and associated start signal amplifier 126 may comprise a tuned circuit operating in response to the start signal (for example 60-cycle interrupted carrier) as described in our prior patent referred to above. The modulated output of the signal detector 111 is connected through the outer armature and back contact of relay 77 to rectifier 136, arranged to decrease the grid bias of amplifier 137 which is normally biased to cut-off. The change in conductance of amplifier 137 increases the bias of amplifier 106, derived from circuit 138, and prevents the carrier from operating relay 76 in the anode circuit of tube 106.

During the first few seconds of phase signal, the level of the received signal is set to the optimum value by the operation of the level control 86 which is mechanically connected to an adjusting motor 115. The phase pulses as described above comprise an interrupted carrier, of say 15 kc. at the output of the print driver 93, interrupted at the beginning of each scanning line. This signal is impressed through the outer armature and front contact of relay 79 and conductor 109 on the input circuit of the first stage amplifier 116 of the gain control circuit. Relay 76, being energized as described above, opens at its inner armature and back contact the shunt circuit through the conductor 117 around the output of the rectifier 118. Relay 81 in the anode circuit of amplifier 119 becomes energized. If the signal from the print driver 93 is at optimum level for printing, relay 81 is immediately released in response to the steady carrier component of the phase pulses through amplifiers 116 and 119. This circuit for releasing relay 81 operates as follows: Amplifier 116 in the first stage is highly biased as indicated and is connected to rectifier 118 which generates a positive D. C. voltage connected in a regenerative sense to the amplifier 116. When the input signal to the amplifier 116 increases to a level which overcomes the cut off bias (makes the amplifier conduct), the regenerative feedback from the rectifier 118 causes its plate voltage to suddenly decrease. This reduction in plate voltage cuts off the amplifier 119 and releases relay 81 in the plate circuit thereof.

Relay 81 through its outer armature and front contact removes supply voltage from the conductor 121 to stop the motor 115 which has advanced the level control 86 until the optimum adjustment is reached (the level control adjusts the attenuation progressively from maximum to minimum and back to maximum as the motor rotates in a single direction).

It should be noted that the output level of the modulator 92 is always equal to or less than the optimum value since, as explained in the above-mentioned Patent No. 2,542,152, if the input signal level is too high, the output level is reduced from the peak value. When relay 81 becomes deenergized it recloses the circuit of relay 77 through its inner armature and back contact, but this relay is disabled while the level is being set. Since relay 76 is energized, the output of the signal detector 111 is connected through the third armature and front contact of relay 76 to the cathode follower gate amplifier 124 of the guard circuit, and the short circuit of rectifier 110 is removed by the operation of the second armature of relay 76.

Amplifier 112 is normally biased beyond cut-off. Phase signals received at the input to cathode follower 124 charge capacitor 120 to a positive value to partially overcome the bias on amplifier 112. Amplifier 112 is still biased beyond cut-off. Rectification of the phase signals (previously set to optimum by level control circuit) by rectifier 110 applies additional positive voltage to bring the grid of amplifier 112 to zero bias. This operates relay 77. It will be apparent therefore that while either the interrupted carrier representing the phase signals is absent, or the optimum signal level has not been reached, amplifier 112 will not operate and relay 77 will not be energized.

The purpose of the guard circuit is to prevent reoperation of the level control circuit after it has been set and to make the phase magnet 82 operative when only phasing signals (modulation) are being received. Relay 77, through its third armature and front contact and conductor 117, short-circuits the output of rectifier 118 in the gain control circuit to prevent further change in the signal level during the remainder of the interval when phase signals are transmitted and during the reception of the start signal. Subsequently the deenergization of relay 79, as described hereinafter, disconnects the signal circuit from the gain control circuit and the level control is rendered inoperative during the entire transmitting cycle.

After the level control has operated to set the level of the signal amplifier, phase signals of the proper level are impressed on the phasing amplifier 95 through the circuit described above. The holding circuit of the phase magnet 82 through the conductor 125 and the inner armature and back contact of relay 77 is now interrupted by the energization of the relay 77. Consequently the phase magnet 82 responds to phasing signals in the form of narrow pulses, say one second apart. As pointed out in our prior patent referred to, the operation of phase magnet 82 on any one of the phasing pulses releases the phasing member of the synchronous drive mechanism so that it is in phase with the remote transmitter scanning mechanism. Any other suitable phasing mechanism may be substituted for that shown or described in said prior patent.

The energization of relay 77 also opens at its second armature and back contact the short-circuit across the start signal amplifier 126. As stated above, the phase signals are followed by a start signal to start the recording. The start signal for example may be the carrier (1800 cycles) interrupted at 60 cycles a second. The output of the start signal amplifier 126 is a 60-cycle sine wave and, when relay 77 is energized and the start signal is received, it is rectified by the rectifier 127 to operate the so-called pulse amplifier 128, usually of the thyratron type having relatively heavy current output. Relays 78 and 80 are connected as shown through capacitors to the output of the pulse amplifier 128 and operate once when the amplifier produces a pulse as the start signal is received. Relay 80, when energized, locks up through a locking circuit including its third armature and front contact and the contacts 129 of the message timer 130. The timer 130 is set to operate in a period slightly less than the time required to transmit a full length message and its function will be described below.

The operation of relay 78 as described breaks at its armature and back contact the holding circuit of relay 79 and this relay becomes deenergized. The lower contact of rleay 79 closes to start stylus drive and paper feed mechanisms, as described above. At the outer armature of relay 79, the signal circuit is transferred to the make contact and armature 131 of the timer 133. The circuit of the timer 133 is closed by the middle armature and back contact of relay 79 and the timer is operated to close the circuit of the print amplifier 134 after a few seconds delay. This delay is provided for the purpose of enabling the recording mechanism to start the stylus 10 moving with respect to the recording sheet before the signal current is applied to the stylus, thus preventing damage to the recording sheet that might be caused by application of current from a stationary stylus. The timer may be omitted if desired.

If the received facsimile signal fails during the normal period of transmission (before the message timer 130 has completed its cycle), relay 76 connected to the carrier detector circuit becomes deenergized, thus reclosing the operating circuit for relay 79 through the upper armature and back contact of relay 76. The energization of relay 79 opens the circuit of the print amplifier 134 and recording stylus 10 at the outer armature and back contact of said relay, and stops the timer 133. When the signal is again received, the operation of relay 76 in response to the transmitted carrier closes a circuit from battery through the outer armature and front contact of said relay and the outer armature and front contact of relay 80 to the pulse amplifier 128, thereby reenergizing relay 78. The operation of relay 78 breaks the holding circuit of relay 79 and relay 79 becomes deenergized, thereby operating the timer 133 and reconnecting the signal amplifier to the print amplifier 134 and recording stylus 10. Since the recording mechanism is still in phase, the message timer 130 is not affected.

After the message timer 130 operates near the end of a transmission, relay 80 becomes deenergized by the opening of contacts 129 and the control circuits return to standby condition as soon as the facsimile signals cease so that the system is in readiness for another transmission if preceeded by the usual phase and start pulses. The cessation of facsimile signals at the end of the message releases relay 76 in the output circuit of the carrier detector system. The release of carrier detector relay 76 recloses the circuit of relay 79 at the outer armature and back contact of relay 76 and relay 79 becomes energized, thereby interrupting the circuit of the print amplifier 134 and stopping the recorder drive mechanism.

If a short message is being transmitted, this is followed by a "stop" signal which is operative to turn off the recording mechanism and reset the control circuit to the standby condition. The stop signal, like the start signal described above, consists of a modulated carrier but is of such character that it can be differentiated from phasing or start signals as well as facsimile signals in order to prevent the stop signal control mechanism from functioning in response to any other signals.

By way of example it is assumed that the stop signal consists of an 1800-cycle carrier simultaneously modulated by a steady 90-cycle and a steady 300-cycle tone. This signal is effective to pass through the stop signal detector system and operate the stop relay 75. The signal detector system referred to comprises detector 145, connected to the print driver 93, and amplifiers 141 and 142 combined with selectively tuned input circuits 143 and 144 to filter out all signals except those having 90- and 300-cycle components. It will be obvious that the amplifiers will not both respond to any other signal than a sustained stop signal since the facsimile signals will not contain simultaneous 90- and 300-cycle components lasting more than a few milliseconds. However when the stop signal is received and the 90- and 300-cycle components of full amplitude are impressed upon the amplifiers 141 and 142, the rectifiers 147 and 148 start to conduct. Normally the amplifier 149, having its input electrode connected to the rectifiers in series, is biased to cut-off from the negative potential derived from the dropping resistor 150. When both rectifiers 147 and 148 become conducting upon the receipt of the stop signal, the potential across the capacitors 151 and 152 builds up until the anode current of the amplifier 149 operates relay 75. Upon the energization of relay 75, the circuit of relay 80 is interrupted at the inner armature and back contact of relay 75, thus releasing the timer 130 and opening the circuit of the pulse amplifier 128 at the upper armature and front contact of relay 80 to prevent restarting of the recording mcehanism as a result of operation of the carrier detector or, in other words, until the phase and start signals preceding the next transmission are received. To further insure against operation of the carrier detector the output of the amplifier 104 is interrupted at the middle armature and back contact of relay 75 when said relay becomes energized. The energization of relay 75 also interrupts at its outer armature and back contact the circuit of the print driver 93 to stop recording at the instant the stop signal is received and maintain the recording circuit open until the end of the stop signal when the control system has been restored to the standby condition in readiness for the control signals preceding the next transmission.

It will be evident that, in accordance with the invention, an efficient control system is provided which will adjust the gain, phase and subsequently start the recorder mechanism in response to signals which consist solely of modulated or interrupted carrier pulses. The advantage of using control signals of this character is that they can be transmitted over alternating current or audio frequency channels as well as radio facsimile channels along with or interspersed with the facsimile signals. As is well known in the art of facsimile transmission, the facsimile signals may be converted from one type of modulation to another in the transmission process whereas control signals such as D. C. or fixed frequency tones would not reach the facsimile receiver. No additional channels or D. C. control circuits are required for automatically controlling all necessary functions for unattended operation of the recorder. In actual practice it has been found tha a system of the character described eliminates undesired operation in response to noise or accidental transmission of combinations of facsimile modulated signals which may accidentally resemble the control signals. The reliable operation of the system is due to the selection of the modulated characteristics of the control signals and to the timing of said signals which enables the detector units to distinguish between true control signals and accidental bursts of similar signals of short duration which may occur in the course of the facsimile transmission.

It should be noted that the automatic level control circuit described compensates for changes in gain of amplifier stages 87, 89, 90, 92 and 93.

Reference has been made to particular frequencies of the carrier and modulation components of control signals in order to explain the underlying principles of the invention. Obviously these specific frequencies may be changed without altering the mode of operation of the system. The transducer represented by the stylus may take other forms to record by light, heat, pressure, et cetera. Various other modifications of the system shown and described for purposes of explanation will occur to those skilled in the art and may be made without departing from the invention.

We claim:

1. In a control system for a facsimile recorder responsive to control signals consisting of modulated and interrupted carrier current transmitted from the transmitting station, in combination, means for controlling the signal level in the recorder including means for rendering the signal level control operative only before the start of the subject copy transmission, means including a motor for adjusting the level control, means including a resonant circuit tuned to the carrier frequency for detecting the interrupted carrier sent preceding subject copy transmission, means including a relay for energizing the motor means to operate the level control and means including said carrier detecting means for operating said relay when the said interrupted carrier is transmitted and the signal level is either less or greater in amplitude than a predetermined optimum value.

2. A control system according to claim 1, comprising means to disable said level control for the duration of copy transmission as soon as the signal level is set to the optimum value.

3. In a control system for a facsimile recorder responsive to control and intelligence signals consisting of modulated carrier current transmitted from the transmitting station, in combination, a signal amplifier, means including an adjustable control for varying the signal level of said amplifier, a transducer connected to said signal amplifier, a gain control circuit comprising an electron discharge tube normally biased to cut-off, means including a connection between the input grid circuit of said tube and said signal amplifier to vary the grid potential to render said tube conductive only at a predetermined signal level, means including said gain control circuit for adjusting said control and means connected to said tube to disable said control at said predetermined signal level.

4. In a control system for a facsimile recorder responsive to control and intelligence signals consisting of modulated carrier current transmitted from the transmitting station, in combination, a signal amplifier, an electro-responsive adjustable level control for the recorder signals, a transducer connected to said signal amplifier, a gain control circuit, means whereby said gain control circuit is responsive to the signal level only when the carrier is first received at the commencement of the transmitting cycle, circuit-closing relay means for energizing said adjustable control to vary the signal level and means including said gain control circuit for enabling or disabling the operation of said circuit closing relay means depending upon whether said signal level is or is not at a predetermined level.

5. In a control system according to claim 4, means for rendering said gain control circuit operative during the transmission of phase signals preceding subject copy transmission and thereafter locking out said gain control circuit.

6. In a control system according to claim 4, means for rendering said gain control circuit operative during the transmission of reference signals of predetermined amplitude from the transmitter and disabling said gain control circuit during subsequent subject copy transmission.

7. In a control system for a facsimile recorder responsive to control and intelligence signals consisting of modulated carrier current transmitted from the transmitting station, in combination, a signal amplifier, an adjustable level control for the recorder signals, a transducer connected to said signal amplifier, a gain control circuit, means whereby said circuit is responsive to the signal level at the recorder only during the transmission of predetermined carrier current signals representing maximum amplitude or level, a drive motor coupled to said level control and means including said gain control circuit for operating said motor to adjust said level control when said predetermined carrier current signals at the recorder are greater or less than a predetermined amplitude.

8. In a control system for a facsimile recorder responsive to phasing control signals consisting of interrupted carrier current of predetermined amplitude transmitted from the transmitting station, in combination, a signal amplifier, an adjustable level control for the recorder signals, a transducer connected to said signal amplifier, means for phasing the recorder, said phasing means including an electromagnet, and means for disabling said electromagnet during the transmission of said phasing control signals of predetermined amplitude until the level control is adjusted to produce recorder signals of predetermined amplitude.

9. In a control system for a facsimile recorder having a movable recording system and responsive to control signals consisting of modulated and interrupted carrier current transmitted from the transmitting station, in combination, phasing mechanism for phasing the recording system, a signal amplifier, a transducer adapted to be operated by said signal amplifier, driving means for the recording system, means including a gain control in the circuit of the transducer for adjusting the recording signal to the optimum level, circuit controlling means for connecting said phasing mechanism to the signal amplifier, for operation, then disconnecting said phasing mechanism and gain control and connecting said transducer to the signal amplifier for recording, and means whereby said circuit-controlling means is responsive to said control signals.

10. A control system according to claim 9 including means whereby the circuit-controlling means for rendering the transducer operative is also responsive to fading or failure of the facsimile signals during transmission of subject copy.

11. In a fascimile recorder system responsive to control and intelligence signals consisting of modulated and interrupted carrier current transmitted from the transmitting station, in combination, level control means to adjust the level of the received signals to optimum value, said level control means comprising a gain control circuit including a first-stage amplifier normally biased beyond cut-off and a second-stage rectifier regeneratively coupled to said first-stage amplifier, means for impressing a control reference signal of substantially constant level and of sufficient duration to activate said gain control circuit upon said first-stage amplifier of said circuit and means for disabling said level control means when the received signals are adjusted to said optimum value and maintaining said last-named means disabled as long as the carrier current is received.

12. In a facsimile recorder system responsive to control and intelligence signals consisting of modulated and interrupted carrier current transmitted from the transmitting station, said system including a recording mechanism, in combination, level control means, phasing means and print-starting means for the recording mechanism, means for activating first said level control means, then said phasing means and then said print-starting means consecutively, in response to certain of said control signals, means for detecting a stop signal of a different character than said other control signals and means connected thereto to restore the recorder system to standby condition when the stop signal is transmitted.

13. In a control system for a facsimile recorder, in combination, driving and phasing mechanisms for said recorder, means for operating said mechanisms to effect recording, a message timer, means for starting the timer at the commencement of copy transmission, means to disable the driving mechanism of the recorder, means to control the last-mentioned means in response to signal failure during copy transmission, means to restart the recorder driving mechanism without losing phase with the facsimile transmitter upon the reappearance of the facsimile message signals and means including said timer for returning the system to standby condition at the end of a normal message transmission period.

14. In a control system for a facsimile recorder, in combination, driving and phasing mechanisms for said recorder, means whereby said phasing mechanism is responsive to phasing pulses from the remote transmitter, means for starting the driving mechanism of the recorder, means whereby said starting means is responsive to a distinctive start signal from the transmitter differing from said phasing pulses and means for disabling the start signal-responsive means until the phasing mechanism of the recorder has been operated.

15. In a control system for a facsimile recorder employing modulated carrier current, in combination, means for controlling a function of the recorder, a carrier detection circuit, means including said carrier detection circuit for controlling said first-mentioned means and means whereby said carrier detection circuit is responsive to phasing signals consisting of maximum level steady carrier signal momentarily interrupted periodically at short intervals but not responsive to amplitude modulated carrier current derived from picture signals.

References Cited in the file of this patent

UNITED STATES PATENTS

| | | |
|---|---|---|
| Re. 22,819 | Ridings et al. | Dec. 17, 1946 |
| 1,690,300 | Horton | Nov. 6, 1928 |
| 1,719,916 | Watson | July 9, 1929 |
| 1,743,856 | Ives | Jan. 14, 1930 |
| 1,953,462 | Bone | Apr. 3, 1934 |
| 2,257,918 | Ressler | Oct. 7, 1941 |
| 2,258,871 | Wedig | Oct. 14, 1941 |
| 2,309,622 | Anderson | Feb. 2, 1943 |
| 2,636,938 | Hester | Apr. 28, 1953 |
| 2,640,874 | McConnell et al. | June 2, 1953 |
| 2,672,503 | Hallden et al. | Mar. 16, 1954 |
| 2,673,891 | Jones | Mar. 30, 1954 |
| 2,729,700 | Hester | Jan. 3, 1956 |
| 2,733,414 | Lansil | Jan. 31, 1956 |